US012726901B2

(12) United States Patent
Fu

(10) Patent No.: US 12,726,901 B2
(45) Date of Patent: Sep. 1, 2026

(54) INFORMATION TRANSMISSION METHOD AND APPARATUS, INFORMATION RECEIVING METHOD AND APPARATUS, AND DEVICE AND STORAGE MEDIUM

(71) Applicant: Beijing Xiaomi Mobile Software Co., Ltd., Beijing (CN)

(72) Inventor: Ting Fu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 271 days.

(21) Appl. No.: 18/703,200

(22) PCT Filed: Oct. 22, 2021

(86) PCT No.: PCT/CN2021/125827
§ 371 (c)(1),
(2) Date: Apr. 19, 2024

(87) PCT Pub. No.: WO2023/065331
PCT Pub. Date: Apr. 27, 2023

(65) Prior Publication Data
US 2024/0422668 A1 Dec. 19, 2024

(51) Int. Cl.
*H04W 52/02* (2009.01)
*H04L 5/00* (2006.01)

(52) U.S. Cl.
CPC ....... *H04W 52/0216* (2013.01); *H04L 5/0053* (2013.01); *H04L 5/0096* (2013.01); *H04W 52/0229* (2013.01)

(58) Field of Classification Search
CPC . H04L 1/16; H04L 5/00; H04L 5/0053; H04L 5/0055–0057; H04L 5/0096;
(Continued)

(56) References Cited

U.S. PATENT DOCUMENTS

2017/0367046 A1* 12/2017 Papasakellariou .... H04W 72/23
2020/0029323 A1 1/2020 Baldemair et al.
(Continued)

FOREIGN PATENT DOCUMENTS

CN 102647791 A 8/2012
CN 110351016 A 10/2019
(Continued)

OTHER PUBLICATIONS

"5G; NR; Physical layer procedures for data," 3GPP TS 38.214, Version 15.4.0, Release 15, Apr. 2019, 104 pages.

*Primary Examiner* — Thomas R Cairns
(74) *Attorney, Agent, or Firm* — McCoy Russell LLP

(57) ABSTRACT

An information transmission method, executed by a network device, and including: generating, in response to the network device configuring a multi-slot physical downlink control channel (PDCCH) monitoring capability for user equipment, downlink control information (DCI), where, the multi-slot PDCCH monitoring capability represents that in a monitoring unit which includes X slots, there are Y consecutive slots for transmitting a PDCCH, a k0 value indicated by the DCI is less than a minimum slot interval, and the DCI indicates that a slot for sending a physical downlink shared channel (PDSCH) is included in the Y consecutive slots; and sending the DCI to the user equipment.

20 Claims, 5 Drawing Sheets

Receive downlink control information (DCI) in response to the network device configuring a multi-slot physical downlink control channel (PDCCH) monitoring capability for user equipment, where a k0 value indicated by the DCI is less than a minimum slot interval

501

Receive the PDSCH based on the DCI

502

Processing module 601

Sending module 602

(58) Field of Classification Search
CPC ............ H04L 5/0098; H04W 52/0216; H04W 52/0229; H04W 52/0232–0235; Y02D 30/70
See application file for complete search history.

(56) References Cited

U.S. PATENT DOCUMENTS

| | | | | |
|---|---|---|---|---|
| 2020/0221379 | A1* | 7/2020 | Choi | H04W 72/23 |
| 2021/0377861 | A1* | 12/2021 | Ang | H04W 52/0209 |
| 2022/0070911 | A1* | 3/2022 | Baldemair | H04L 5/0044 |
| 2022/0095351 | A1* | 3/2022 | Baldemair | H04L 1/1887 |

FOREIGN PATENT DOCUMENTS

| | | | |
|---|---|---|---|
| CN | 111278096 | A | 6/2020 |
| CN | 112153724 | A | 12/2020 |
| CN | 112514317 | A | 3/2021 |
| CN | 113453322 | A | 9/2021 |
| WO | 2021148040 | A1 | 7/2021 |

* cited by examiner

Receive downlink control information (DCI) from a network device in response to the network device configuring a multi-slot physical downlink control channel (PDCCH) monitoring capability for user equipment, where a k0 value indicated by the DCI is less than a minimum slot interval

401

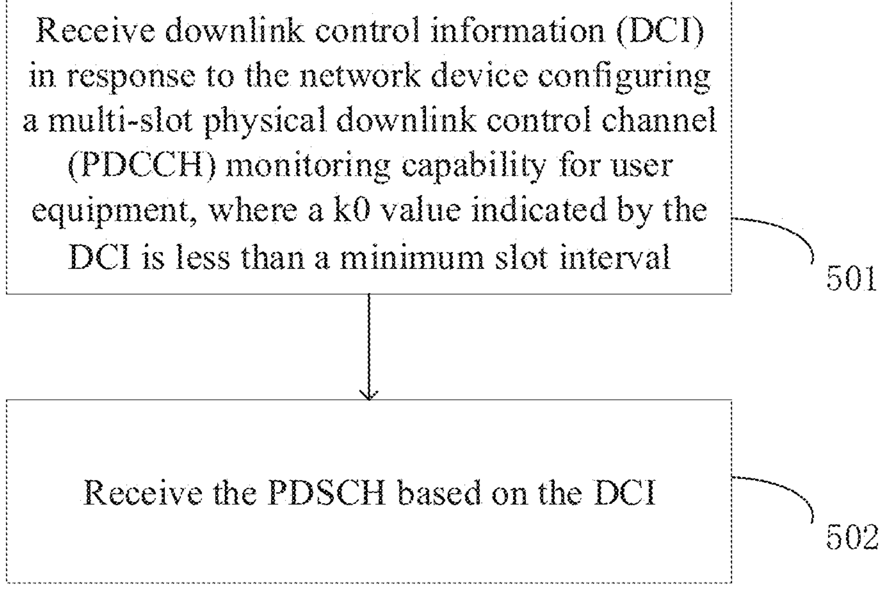
Figure 5
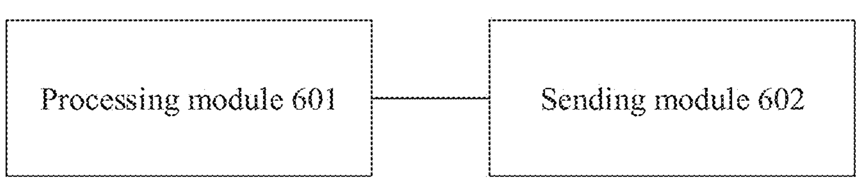
Figure 6
Receiving module 701
Figure 7

INFORMATION TRANSMISSION METHOD AND APPARATUS, INFORMATION RECEIVING METHOD AND APPARATUS, AND DEVICE AND STORAGE MEDIUM

CROSS-REFERENCE TO RELATED APPLICATIONS

The present application is a U.S. National Stage of International Application No. PCT/CN2021/125827, entitled “INFORMATION TRANSMISSION METHOD AND APPARATUS, INFORMATION RECEIVING METHOD AND APPARATUS, AND DEVICE AND STORAGE MEDIUM”, filed on Oct. 22, 2021, the contents of all of which are incorporated herein by reference in their entireties for all purposes.

BACKGROUND OF THE INVENTION

In order to reduce power consumption of user equipment, a limitation of a minimum interval value k0_min between a slot for transmitting downlink control information (DCI) and a slot for transmitting a physical downlink shared channel (PDSCH) scheduled by the DCI is introduced.

A multi-slot physical downlink control channel (PDCCH) monitoring pattern is introduced in an NR 52.6-71 GHz project, where, a multi-slot PDCCH monitoring capability defines a capability of the user equipment to monitor the PDCCH in X slots. In the X slots, there are Y consecutive slots available for transmitting the PDCCH.

SUMMARY OF THE INVENTION

The disclosure relates to the field of wireless communications, in particular to an information transmission method and apparatus, an information receiving method and apparatus, a device and a storage medium.

According to a first aspect of an example of the disclosure, an information transmission method is provided and executed by a network device. The information transmission method includes:

generating downlink control information (DCI) in response to the network device configuring a multi-slot physical downlink control channel (PDCCH) monitoring capability for user equipment, where, the multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots; and sending the DCI to the user equipment;

where, k0 is a slot interval between a slot for transmitting the DCI and a slot for transmitting the PDSCH scheduled by the DCI, the minimum slot interval is a minimum slot interval between the slot for transmitting the DCI and the slot for transmitting the PDSCH, X and Y are both positive integers greater than 1, and X≥Y.

According to a second aspect of an example of the disclosure, an information receiving method is provided and executed by user equipment. The information receiving method includes:

receiving, in response to a network device configuring a multi-slot physical downlink control channel (PDCCH) monitoring capability for the user equipment, downlink control information (DCI) from the network device, where, the multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots;

where, k0 is a slot interval between a slot for transmitting the DCI and a slot for transmitting a PDSCH scheduled by the DCI, the minimum slot interval is a minimum slot interval between the slot for transmitting the DCI and the slot for transmitting the PDSCH, X and Y are both positive integers greater than 1, and X≥Y.

According to a third aspect of an example of the disclosure, an information transmission apparatus is provided and applied to a network device. The information transmission apparatus includes:

a processing module, configured to generate downlink control information (DCI) in response to the network device configuring a multi-slot physical downlink control channel (PDCCH) monitoring capability for user equipment, where, the multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots; and a sending module, configured to send the DCI to the user equipment;

where, k0 is a slot interval between a slot for transmitting the DCI and a slot for transmitting a PDSCH scheduled by the DCI, the minimum slot interval is a minimum slot interval between the slot for transmitting the DCI and the slot for transmitting the PDSCH, X and Y are both positive integers greater than 1, and X≥Y.

According to a fourth aspect of an example of the disclosure, an information receiving apparatus is provided and applied to user equipment. The information receiving apparatus includes:

a receiving module, configured to receive, in response to a network device configuring a multi-slot physical downlink control channel (PDCCH) monitoring capability for the user equipment, downlink control information (DCI) from the network device, where, the multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots;

where, k0 is a slot interval between a slot for transmitting the DCI and a slot for transmitting a PDSCH scheduled by the DCI, the minimum slot interval is a minimum slot interval between the slot for transmitting the DCI and the slot for transmitting the PDSCH, X and Y are both positive integers greater than 1, and X≥Y.

According to a fifth aspect of an example of the disclosure, a network device is provided. The network device includes:

one or more processors; and a memory configured to store a processor-executable instruction.

The one or more processors are collectively configured to execute the processor-executable instruction in the memory to implement steps of the above information transmission method.

According to a sixth aspect of an example of the disclosure, a mobile terminal is provided. The mobile terminal includes:

one or more processors; and a memory configured to store a processor-executable instruction.

The one or more processors are collectively configured to execute the processor-executable instruction in the memory to implement steps of the above information receiving method.

According to a seventh aspect of an example of the disclosure, a non-transitory computer readable storage medium is provided. The non-transitory computer readable storage medium stores an executable instruction. The executable instruction, when executed by one or more processors, implements steps of the above information transmission method or steps of the above information receiving method.

BRIEF DESCRIPTION OF DRAWINGS

The accompanying drawings described are used to provide further understanding of examples of the disclosure and constitute a part of the present disclosure. The illustrative examples of the examples of the disclosure and their descriptions are used to explain the examples of the disclosure and do not constitute an undue limitation of the examples of the disclosure. In the accompanying drawings:

the accompanying drawings are incorporated into the specification and constitute a part of the specification, showing examples consistent with the examples of the disclosure, and are used together with the specification to explain the principles of the examples of the disclosure.

FIG. 5 is a flow chart of an information receiving method according to an example.

FIG. 6 is a block diagram of an information transmission apparatus according to an example.

FIG. 7 is a block diagram of an information receiving apparatus according to an example.

DETAILED DESCRIPTION OF THE INVENTION

Figure 1:
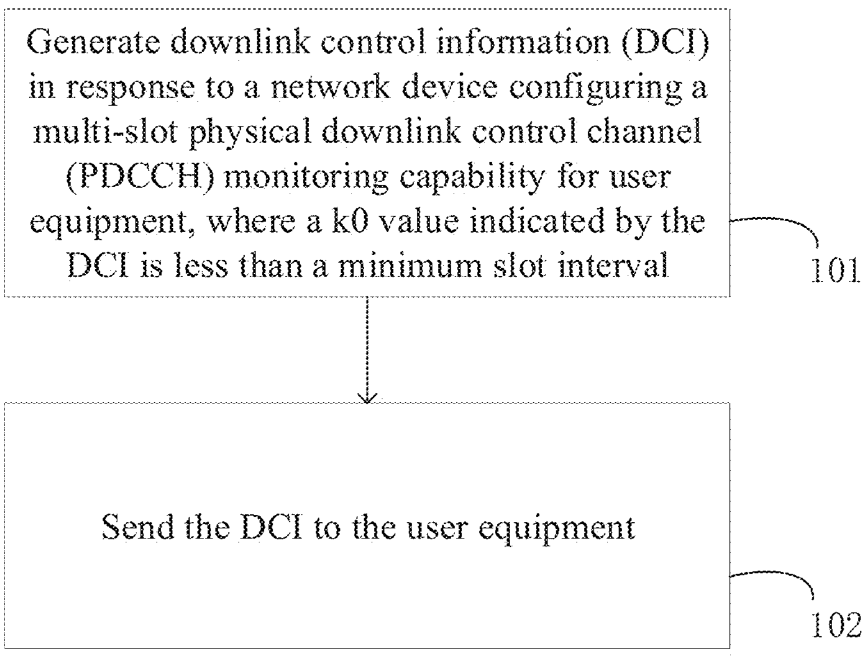
FIG. 1 is a flow chart of an information transmission method according to an example.

Examples of the disclosure are further explained in conjunction with accompanying drawings and implementations.

Examples will be described in detail, and their instances are shown in the accompanying drawings. When the following description refers to the accompanying drawings, unless otherwise indicated, the same numbers in different accompanying drawings indicate the same or similar elements. The implementations described in the following examples do not represent all implementations consistent with the examples of the disclosure. Rather, they are instances of apparatuses and methods consistent with some aspects of the disclosure as detailed in the appended claims.

It is to be noted that, one example of the disclosure may include a plurality of steps. For ease of description, these steps are numbered. However, these numbers do not limit execution slots or execution orders among the steps. These steps may be implemented in any order, which is not limited in the examples of the disclosure.

In a case of configuring a minimum slot interval k0_min between a slot for transmitting DCI and a slot for transmitting a PDSCH scheduled by the DCI, the user equipment does not need to attempt to receive the PDSCH after receiving a PDCCH, but can temporarily enter a sleep state and be awakened until k0_min slots have elapsed after receiving the PDCCH. At this moment, the PDCCH has been demodulated, and the user equipment can receive the PDSCH on a corresponding time-frequency resource according to indication of the DCI. That is, the UE does not expect k_0 of the scheduled PDSCH to be less than k0_min.

In a case of a band width part (BWP) switching, a calculation method for k0_min is changed accordingly. The k0_min after the BWP switches is calculated by the following formula:

$$\left\lceil \text{k0\_min} \cdot \frac{2^{\mu'}}{2^{\mu}} \right\rceil$$

where, μ represents a parameter value corresponding to a subcarrier interval of a BWP before the BWP switches, and μ' represents a parameter value corresponding to a subcarrier interval of a BWP after the BWP switches.

Two pending definitions for the multi-slot PDCCH monitoring capability are as follows.

One is a fixed-pattern-based multi-slot group (X/Y). A slot group fixedly contains X slots. Each slot group is consecutive and non-overlapping. There are Y consecutive slots in the X slots available for monitoring the PDCCH. One is a span-pattern-based multi-slot group span (X/Y). X is a minimum interval between two adjacent spans, measured in slots. In one span, the PDCCH can be monitored merely on Y consecutive slots/symbols.

A multi-slot physical downlink control channel (PDCCH) monitoring pattern is introduced in an NR 52.6-71 GHz project, where, a multi-slot PDCCH monitoring capability defines a capability of the user equipment to monitor the PDCCH in X slots. In the X slots, there are Y consecutive slots available for transmitting the PDCCH.

In the multi-slot PDCCH monitoring pattern, the limitation of the minimum interval value k0_min needs to be adjusted.

An example of the disclosure provides an information transmission method. The information transmission method is executed by a network device. The information transmission method may be executed independently or may be executed together in combination with any one of other examples of the examples of the disclosure. FIG. 1 is a flow chart of an information transmission method according to an example. As shown in FIG. 1, the information transmission method includes steps 101 and 102.

Step 101 includes generating downlink control information (DCI) in response to the network device configuring a multi-slot physical downlink control channel (PDCCH)

monitoring capability for user equipment. The multi-slot PDCCH monitoring capability represents that in a monitoring unit which includes X slots, Y consecutive slots for transmitting a PDCCH exist. A k0 value indicated by the DCI is less than a minimum slot interval, and the DCI indicates that a slot for sending a physical downlink shared channel (PDSCH) is contained in the Y consecutive slots.

Step 102 includes sending the DCI to the user equipment.

k0 is a slot interval between a slot for transmitting the DCI and a slot for transmitting a PDSCH scheduled by the DCI. The minimum slot interval is a minimum slot interval between the slot for transmitting the DCI and the slot for transmitting the PDSCH. X and Y are both positive integers greater than 1, and X≥Y.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist. The network device generates DCI in response to this configuration and sends the DCI to the user equipment. The k0 value indicated by the DCI is less than the minimum slot interval, and the DCI indicates that a slot for sending a PDSCH is contained in the Y consecutive slots.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist, and N slots in the Y consecutive slots are configured with search space. The network device generates DCI in response to this configuration and sends the DCI to the user equipment. The k0 value indicated by the DCI is less than the minimum slot interval, and the DCI indicates that a slot for sending a PDSCH is contained in the N slots. The minimum slot interval is determined based on a communication protocol and/or is configured through signaling of the network device.

In a multi-slot PDCCH monitoring pattern, a user terminal needs to maintain an awakened state in the Y consecutive slots to ensure the monitoring of the PDCCH. In the above examples, the DCI indicates that the slot for sending a PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

Figure 2:
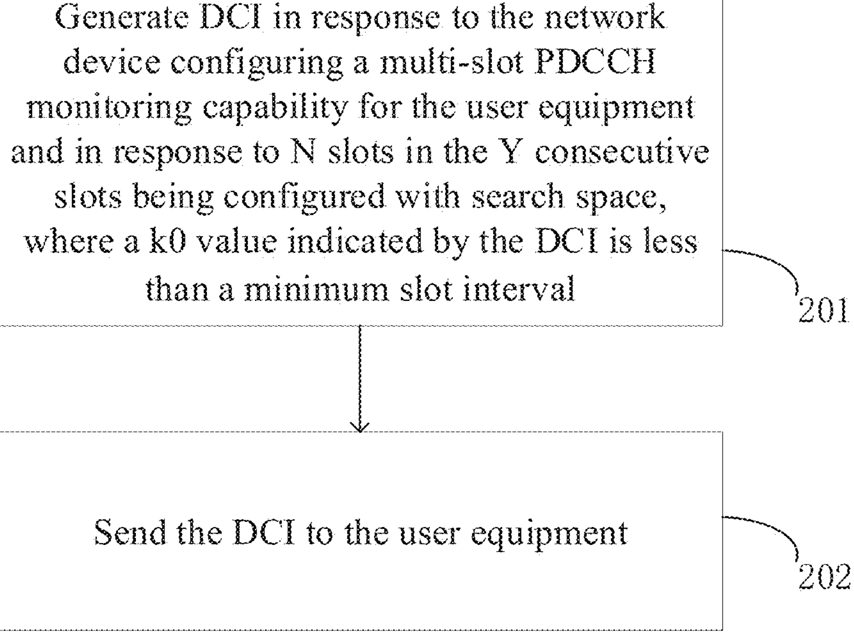
FIG. 2 is a flow chart of an information transmission method according to an example.

An example of the disclosure provides an information transmission method. The information transmission method is executed by a network device. The information transmission method may be executed independently or may be executed together in combination with any one of other examples of the examples of the disclosure. FIG. 2 is a flow chart of an information transmission method according to an example. As shown in FIG. 2, the information transmission method includes steps 201 and 202.

Step 201 includes generating the DCI in response to the network device configuring a multi-slot PDCCH monitoring capability for the user equipment and in response to N slots in the Y consecutive slots being configured with search space. The multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a PDSCH is contained in the N slots.

Step 202 includes sending the DCI to the user equipment.

k0 is a slot interval between a slot for transmitting the DCI and a slot for transmitting a PDSCH scheduled by the DCI. The minimum slot interval is a minimum slot interval between the slot for transmitting the DCI and the slot for transmitting the PDSCH. X and Y are both positive integers greater than 1. N is a positive integer greater than or equal to 1. X≥Y, and N≤Y.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist, and N slots in the Y consecutive slots are configured with search space. The network device generates the DCI in response to this configuration and sends the DCI to the user equipment. The k0 value indicated by the DCI is less than the minimum slot interval, and the DCI indicates that a slot for sending a PDSCH is contained in the N slots.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist, and N slots in the Y consecutive slots are configured with search space, where Y=3, and N=2. The network device generates the DCI in response to this configuration and sends the DCI to the user equipment. The k0 value indicated by the DCI is less than the minimum slot interval, and the DCI indicates that a slot for sending a PDSCH is contained in the above 2 slots configured with the search space.

In a multi-slot PDCCH monitoring pattern, a user terminal needs to maintain an awakened state in the Y consecutive slots to ensure the monitoring of the PDCCH. In the above examples, the DCI indicates that the slot for sending a PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

An example of the disclosure provides an information transmission method. The information transmission method is executed by a network device. The information transmission method may be executed independently or may be executed together in combination with any one of other examples of the examples of the disclosure. The information transmission method includes:

generating downlink control information (DCI) in response to the network device configuring a multi-slot physical downlink control channel (PDCCH) monitoring capability for user equipment, where, the multi-slot PDCCH monitoring capability represents that in a monitoring unit which includes X slots, Y consecutive slots for transmitting a PDCCH exist, in a scenario where the DCI schedules a plurality of PDSCHs, a k0 value indicated by the DCI is less than a minimum slot interval, and the DCI indicates that slots for sending the plurality of PDSCHs are all contained in the Y consecutive slots; and sending the DCI to the user equipment;

where, the k0 is a slot interval between a slot for transmitting the DCI and a slot for transmitting a PDSCH scheduled by the DCI, the minimum slot interval is a minimum slot interval between the slot for transmitting the DCI and the slot for transmitting the PDSCH, X and Y are both positive integers greater than 1, and X≥Y.

In an example, the network device configures the multi-slot PDCCH monitoring capability for the user equipment.

The multi-slot PDCCH monitoring capability represents that in a monitoring unit which includes X slots, Y consecutive slots for transmitting the PDCCH exist. The network device generates DCI in response to this configuration and sends the DCI to the user equipment. In a case that the network device schedules a plurality of PDSCHs in the DCI, the k0 value indicated by the DCI is less than the minimum slot interval, and the DCI indicates that the slots for sending the plurality of PDSCHs are all contained in the above Y consecutive slots.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist, and N slots in the Y consecutive slots are configured with search space. The network device generates DCI in response to this configuration and sends the DCI to the user equipment. In a case that the network device schedules a plurality of PDSCHs in the DCI, the k0 value indicated by the DCI is less than the minimum slot interval, and the DCI indicates that the slots for sending the plurality of PDSCHs are all contained in the above N slots. The minimum slot interval is determined based on a communication protocol and/or is configured through signaling of the network device.

In a multi-slot PDCCH monitoring pattern, a user terminal needs to maintain an awakened state in the above-mentioned Y consecutive slots to ensure the monitoring of the PDCCH. In the above examples, the DCI indicates that the slot for sending a PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

An example of the disclosure provides an information transmission method. The information transmission method is executed by a network device. The information transmission method may be executed independently or may be executed together in combination with any one of other examples of examples of the disclosure. The information transmission method includes:

generating the DCI in response to the network device configuring a multi-slot PDCCH monitoring capability for the user equipment and in response to N slots in the Y consecutive slots being configured with search space, where, the multi-slot PDCCH monitoring capability represents that in a monitoring unit which includes X slots, Y consecutive slots for transmitting a PDCCH exist, in a scenario where the DCI schedules a plurality of PDSCHs, a k0 value indicated by the DCI is less than a minimum slot interval, and the DCI indicates that slots for sending the plurality of PDSCHs are all contained in the N slots; and sending the DCI to the user equipment;

where, the k0 is a slot interval between a slot for transmitting the DCI and a slot for transmitting a PDSCH scheduled by the DCI, the minimum slot interval is a minimum slot interval between the slot for transmitting the DCI and the slot for transmitting the PDSCH, X, Y and N are all positive integers greater than 1, X≥Y, and N≤Y.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist, and N slots in the Y consecutive slots are configured with search space. The network device generates DCI in response to this configuration and sends the DCI to the user equipment. In a case that the network device schedules a plurality of PDSCHs in the DCI, the k0 value indicated by the DCI is less than the minimum slot interval, and the DCI indicates that the slots for sending the plurality of PDSCHs are all contained in the N slots.

In an example, the network device configures the multi-slot PDCCH monitoring capability for the user equipment. The multi-slot PDCCH monitoring capability represents that in a monitoring unit which includes X slots, Y consecutive slots for transmitting a PDCCH exist, and N slots in the Y consecutive slots are configured with search space, where Y=3, and N=2. The network device generates DCI in response to this configuration and sends the DCI to the user equipment. In a case that the network device schedules two PDSCHs in the DCI, the k0 value indicated by the DCI is less than the minimum slot interval, and the DCI indicates that the slots for sending the two PDSCHs are contained in the above 2 slots configured with the search space.

In a multi-slot PDCCH monitoring pattern, a user terminal needs to maintain an awakened state in the above-mentioned Y consecutive slots to ensure the monitoring of the PDCCH. In the above examples, the DCI indicates that the slot for sending the PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

An example of the disclosure provides an information transmission method. The information transmission method is executed by a network device. The information transmission method may be executed independently or may be executed together in combination with any one of other examples of examples of the disclosure. The information transmission method includes:

generating downlink control information (DCI) in response to the network device configuring a multi-slot physical downlink control channel (PDCCH) monitoring capability for user equipment, where, the multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots; and sending the DCI to the user equipment;

where, the k0 is a slot interval between a slot for transmitting the DCI and a slot for transmitting a PDSCH scheduled by the DCI, the minimum slot interval is a minimum slot interval between the slot for transmitting the DCI and the slot for transmitting the PDSCH, the minimum slot interval is determined based on a communication protocol and/or is configured through signaling of the network device, X and Y are both positive integers greater than 1, and X≥Y.

In an example, the network device configures the multi-slot PDCCH monitoring capability for the user equipment. The multi-slot PDCCH monitoring capability represents that in a monitoring unit which includes X slots, Y consecutive slots for transmitting a PDCCH exist. The network device generates DCI in response to this configuration and sends the DCI to the user equipment. The k0 value indicated by the DCI is less than the minimum slot interval, and the DCI indicates that a slot for sending a PDSCH is contained in the Y consecutive slots. The minimum slot interval is determined based on a communication protocol.

In an example, the network device configures the multi-slot PDCCH monitoring capability for the user equipment. The multi-slot PDCCH monitoring capability represents that in a monitoring unit which includes X slots, Y consecutive slots for transmitting a PDCCH exist. The network device generates DCI in response to this configuration and sends the DCI to the user equipment. The k0 value indicated by the DCI is less than the minimum slot interval, and the DCI indicates that a slot for sending a PDSCH is contained in the Y consecutive slots. The minimum slot interval is configured through the signaling of the network device.

In an example, the network device configures the multi-slot PDCCH monitoring capability for the user equipment. The multi-slot PDCCH monitoring capability represents that in a monitoring unit which includes X slots, Y consecutive slots for transmitting a PDCCH exist. The network device generates DCI in response to this configuration and sends the DCI to the user equipment. The k0 value indicated by the DCI is less than the minimum slot interval, and the DCI indicates that a slot for sending a PDSCH is contained in the Y consecutive slots. The minimum slot interval is configured based on a communication protocol and through signaling of the network device.

In an example, the network device configures the multi-slot PDCCH monitoring capability for the user equipment. The multi-slot PDCCH monitoring capability represents that in a monitoring unit which includes X slots, Y consecutive slots for transmitting a PDCCH exist. The network device generates DCI in response to this configuration and sends the DCI to the user equipment. The k0 value indicated by the DCI is less than the minimum slot interval, and the DCI indicates that a slot for sending a PDSCH is contained in the Y consecutive slots. In this example, switching of BWP occurs, and thus, the minimum slot interval is obtained based on the following formula:

$$\left\lceil k0\_min \cdot \frac{2^{\mu'}}{2^{\mu}} \right\rceil;$$

where, k0_min is configured based on the communication protocol, and μ and μ' are configured through the signaling of the network device.

In a multi-slot PDCCH monitoring pattern, a user terminal needs to maintain an awakened state in the above-mentioned Y consecutive slots to ensure the monitoring of the PDCCH. In the above examples, the DCI indicates that the slot for sending the PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

Figures 3, 4:
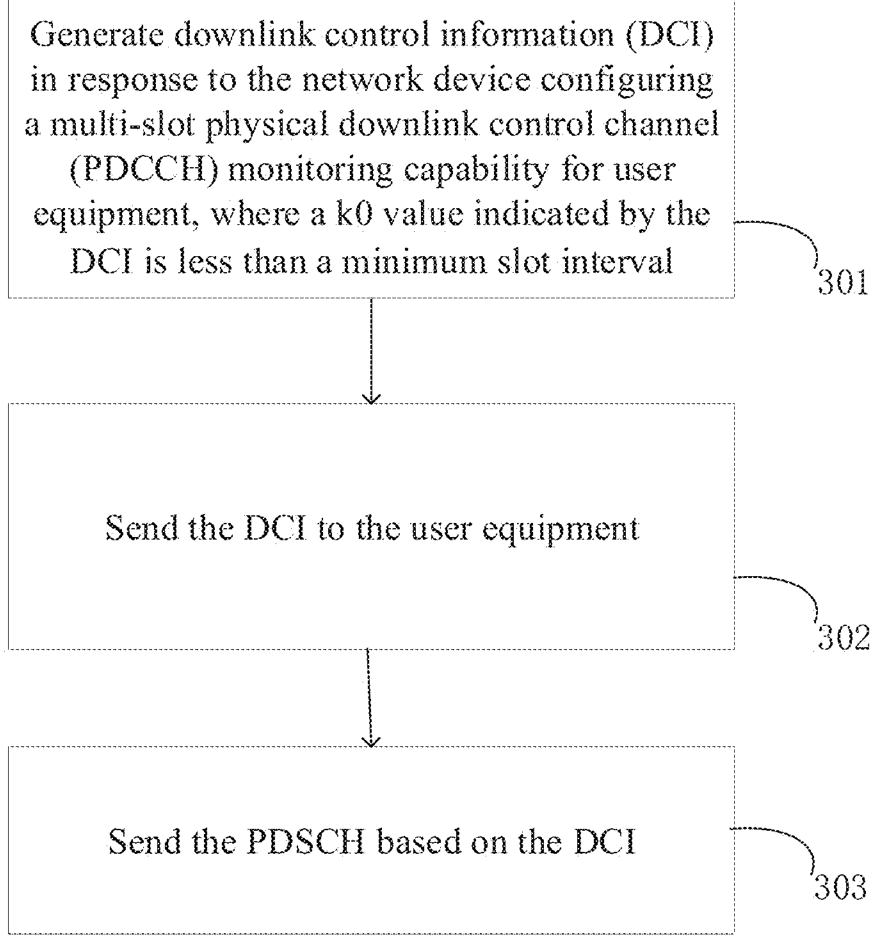
FIG. 3 is a flow chart of an information transmission method according to an example.
FIG. 4 is a flow chart of an information receiving method according to an example.

An example of the disclosure provides an information transmission method. The information transmission method is executed by a network device. The information transmission method may be executed independently or may be executed together in combination with any one of other examples of examples of the disclosure. FIG. 3 is a flow chart of an information transmission method according to an example. As shown in FIG. 3, the information transmission method includes steps 301 to 303.

Step 301 includes generating downlink control information (DCI) in response to the network device configuring a multi-slot physical downlink control channel (PDCCH) monitoring capability for user equipment. The multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots.

Step 302 includes sending the DCI to the user equipment.

Step 303 includes sending the PDSCH based on the DCI.

k0 is a slot interval between a slot for transmitting the DCI and a slot for transmitting a PDSCH scheduled by the DCI, the minimum slot interval is a minimum slot interval between the slot for transmitting the DCI and the slot for transmitting the PDSCH, X and Y are both positive integers greater than 1, and X≥Y.

In an example, the network device configures the multi-slot PDCCH monitoring capability for the user equipment. The multi-slot PDCCH monitoring capability represents that in a monitoring unit which includes X slots, Y consecutive slots for transmitting a PDCCH exist. The network device generates DCI in response to this configuration and sends the DCI to the user equipment. The k0 value indicated by the DCI is less than the minimum slot interval, and the DCI indicates that a slot for sending a PDSCH is contained in the Y consecutive slots. The network device sends the PDSCH in a slot for sending the PDSCH and indicated by the DCI.

In an example, the network device configures the multi-slot PDCCH monitoring capability for the user equipment. The multi-slot PDCCH monitoring capability represents that in a monitoring unit which includes X slots, Y consecutive slots for transmitting a PDCCH exist, and N slots in the Y consecutive slots are configured with search space. The network device generates DCI in response to this configuration and sends the DCI to the user equipment. The k0 value indicated by the DCI is less than the minimum slot interval, and the DCI indicates that a slot for sending a PDSCH is contained in the N slots. The network device sends the PDSCH in a slot for sending the PDSCH and indicated by the DCI.

In an example, the network device configures the multi-slot PDCCH monitoring capability for the user equipment. The multi-slot PDCCH monitoring capability represents that in a monitoring unit which includes X slots, Y consecutive slots for transmitting a PDCCH exist. The network device generates DCI in response to this configuration and sends the DCI to the user equipment. In a case that the network device schedules a plurality of PDSCHs in the DCI, the k0 value indicated by the DCI is less than the minimum slot interval, and the DCI indicates that the slots for sending the plurality of PDSCHs are contained in the Y consecutive slots. The network device sends the plurality of PDSCHs respectively in the slots for sending the plurality of PDSCHs and indicated by the DCI.

In an example, the network device configures the multi-slot PDCCH monitoring capability for the user equipment. The multi-slot PDCCH monitoring capability represents that in a monitoring unit which includes X slots, Y consecutive slots for transmitting a PDCCH exist, and N slots in the Y consecutive slots are configured with search space. The network device generates DCI in response to this configuration and sends the DCI to the user equipment. In a case that the network device schedules a plurality of PDSCHs in the DCI, the k0 value indicated by the DCI is less than the minimum slot interval, and the DCI indicates that the slots for sending the PDSCHs are contained in the N slots. The network device sends the plurality of PDSCHs in the slots for sending the plurality of PDSCHs and indicated by the DCI.

In a multi-slot PDCCH monitoring pattern, a user terminal needs to maintain an awakened state in the above-mentioned Y consecutive slots to ensure the monitoring of the PDCCH. In the above examples, the DCI indicates that the slot for sending the PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

An example of the disclosure provides an information transmission method. The information transmission method is executed by a network device. The information transmission method may be executed independently or may be executed together in combination with any one of other examples of examples of the disclosure. The information transmission method includes:

- generating downlink control information (DCI) in response to the network device configuring a multi-slot physical downlink control channel (PDCCH) monitoring capability for user equipment, where, the multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots; and
- sending the DCI to the user equipment.

The k0 is a slot interval between a slot for transmitting the DCI and a slot for transmitting a PDSCH scheduled by the DCI. The minimum slot interval is a minimum slot interval between the slot for transmitting the DCI and the slot for transmitting the PDSCH. X and Y are both positive integers greater than 1, and X≥Y.

In an example, the network device configures the multi-slot PDCCH monitoring capability for the user equipment. The multi-slot PDCCH monitoring capability represents that in a monitoring unit which includes X slots, Y consecutive slots for transmitting a PDCCH exist. The multi-slot PDCCH monitoring capability configured by the network device for the user equipment adopts the fixed-pattern-based multi-slot group mentioned above. The network device generates DCI in response to this configuration and sends the DCI to the user equipment. The k0 value indicated by the DCI is less than the minimum slot interval, and the DCI indicates that a slot for sending the PDSCH is contained in the Y consecutive slots.

In an example, the network device configures the multi-slot PDCCH monitoring capability for the user equipment. The multi-slot PDCCH monitoring capability represents that in a monitoring unit which includes X slots, Y consecutive slots for transmitting a PDCCH exist. The multi-slot PDCCH monitoring capability configured by the network device for the user equipment adopts the fixed-pattern-based multi-slot group mentioned above. N slots in the Y consecutive slots are configured with search space. The network device generates DCI in response to this configuration and sends the DCI to the user equipment. The k0 value indicated by the DCI is less than the minimum slot interval, and the DCI indicates that a slot for sending the PDSCH is contained in the N slots.

In a multi-slot PDCCH monitoring pattern, a user terminal needs to maintain an awakened state in the above-mentioned Y consecutive slots to ensure the monitoring of the PDCCH. In the above examples, the DCI indicates that the slot for sending the PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

An example of the disclosure provides an information transmission method. The information transmission method is executed by a network device. The information transmission method may be executed independently or may be executed together in combination with any one of other examples of examples of the disclosure. The information transmission method includes:

- generating downlink control information (DCI) in response to the network device configuring a multi-slot physical downlink control channel (PDCCH) monitoring capability for user equipment, where, the multi-slot PDCCH monitoring capability represents that in a monitoring unit which includes X slots and includes M slots, where M>X, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots; and
- sending the DCI to the user equipment.

The k0 is a slot interval between a slot for transmitting the DCI and a slot for transmitting a PDSCH scheduled by the DCI. The minimum slot interval is a minimum slot interval between the slot for transmitting the DCI and the slot for transmitting the PDSCH. X, Y and M are all positive integers greater than 1, X≥Y, and M>X.

In an example, the network device configures the multi-slot PDCCH monitoring capability for the user equipment. The multi-slot PDCCH monitoring capability represents that in a monitoring unit which includes M slots, Y consecutive slots for transmitting a PDCCH exist. The multi-slot PDCCH monitoring capability configured by the network device for the user equipment adopts the span-pattern-based multi-slot group span mentioned above. The network device generates DCI in response to this configuration and sends the DCI to the user equipment. The k0 value indicated by the DCI is less than the minimum slot interval, and the DCI indicates that a slot for sending the PDSCH is contained in the Y consecutive slots.

In an example, the network device configures the multi-slot PDCCH monitoring capability for the user equipment. The multi-slot PDCCH monitoring capability represents that in a monitoring unit which includes M slots, Y consecutive slots for transmitting a PDCCH exist. The multi-slot PDCCH monitoring capability configured by the network device for the user equipment adopts the span-pattern-based multi-slot group span. N slots in the Y consecutive slots are configured with search space. The network device generates DCI in response to this configuration and sends the DCI to the user equipment. The k0 value indicated by the DCI is less than the minimum slot interval, and the DCI indicates that a slot for sending the PDSCH is contained in the N slots.

In a multi-slot PDCCH monitoring pattern, a user terminal needs to maintain an awakened state in the above-mentioned Y consecutive slots to ensure the monitoring of the PDCCH. In the above examples, the DCI indicates that the slot for sending the PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

An example of the disclosure provides an information receiving method. The information receiving method is executed by user equipment. The information receiving method may be executed independently or may be executed together in combination with any one of other examples of examples of the disclosure. FIG. 4 is a flow chart of an information receiving method according to an example. As shown in FIG. 4, the information receiving method includes step 401.

Step 401 includes receiving, in response to a network device configuring a multi-slot physical downlink control channel (PDCCH) monitoring capability for the user equipment, downlink control information (DCI) from the network device. The multi-slot PDCCH monitoring capability represents that in a monitoring unit which includes X slots, Y consecutive slots for transmitting the PDCCH exist, a k0 value indicated by the DCI is less than a minimum slot interval, and the DCI indicates that a slot for sending a physical downlink shared channel (PDSCH) is contained in the Y consecutive slots.

The k0 is a slot interval between a slot for transmitting the DCI and a slot for transmitting a PDSCH scheduled by the DCI. The minimum slot interval is a minimum slot interval between the slot for transmitting the DCI and the slot for transmitting the PDSCH. X and Y are both positive integers greater than 1, and X≥Y.

In an example, the network device configures the multi-slot PDCCH monitoring capability for the user equipment. The multi-slot PDCCH monitoring capability represents that in a monitoring unit which includes X slots, Y consecutive slots for transmitting a PDCCH exist. In this scenario, the user equipment receives the DCI from the network device, the k0 value indicated by the DCI is less than the minimum slot interval, and the DCI indicates that a slot for sending the PDSCH is contained in the Y consecutive slots.

In an example, the network device configures the multi-slot PDCCH monitoring capability for the user equipment. The multi-slot PDCCH monitoring capability represents that in a monitoring unit which includes X slots, Y consecutive slots for transmitting a PDCCH exist, and N slots in the Y consecutive slots are configured with search space. In this scenario, the user equipment receives the DCI from the network device, the k0 value indicated by the DCI is less than the minimum slot interval, and the DCI indicates that a slot for sending the PDSCH is contained in the above N slots. The minimum slot interval is determined based on a communication protocol and/or is configured through signaling of the network device.

In a multi-slot PDCCH monitoring pattern, a user terminal needs to maintain an awakened state in the above-mentioned Y consecutive slots to ensure the monitoring of the PDCCH. In the above examples, the DCI indicates that the slot for sending the PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

An example of the disclosure provides an information receiving method. The information receiving method is executed by user equipment. The information receiving method may be executed independently or may be executed together in combination with any one of other examples of examples of the disclosure. The information receiving method includes:

receiving, in response to a network device configuring a multi-slot physical downlink control channel (PDCCH) monitoring capability for the user equipment, downlink control information (DCI) from the network device, where, the multi-slot PDCCH monitoring capability represents that in a monitoring unit which includes X slots, Y consecutive slots for transmitting the PDCCH exist, in a scenario where N slots in the Y consecutive slots are configured with search space, a k0 value indicated by the DCI is less than a minimum slot interval, and the DCI indicates that a slot for sending the PDSCH is contained in the N slots.

The k0 is a slot interval between a slot for transmitting the DCI and a slot for transmitting a PDSCH scheduled by the DCI. The minimum slot interval is a minimum slot interval between the slot for transmitting the DCI and the slot for transmitting the PDSCH. X and Y are both positive integers greater than 1, N is a positive integer greater than or equal to 1, X≥Y, and N≤Y.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist, and N slots in the Y consecutive slots are configured with search space. In this scenario, the user equipment receives the DCI from the network device, the k0 value indicated by the DCI is less than the minimum slot interval, and the DCI indicates that a slot for sending the PDSCH is contained in the above N slots.

In a multi-slot PDCCH monitoring pattern, a user terminal needs to maintain an awakened state in the above-mentioned Y consecutive slots to ensure the monitoring of the PDCCH. In the above examples, the DCI indicates that the slot for sending the PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

An example of the disclosure provides an information receiving method. The information receiving method is executed by user equipment. The information receiving method may be executed independently or may be executed together in combination with any one of other examples of examples of the disclosure. The information receiving method includes:

receiving, in response to a network device configuring a multi-slot physical downlink control channel (PDCCH) monitoring capability for the user equipment, downlink control information (DCI) from the network device, where, the multi-slot PDCCH monitoring capability represents that in a monitoring unit which includes X slots, Y consecutive slots for transmitting the PDCCH exist, in a scenario where the DCI schedules a plurality of PDSCHs, a k0 value indicated by the DCI is less than a minimum slot interval, and the DCI indicates that slots for sending the plurality of PDSCHs are all contained in the Y consecutive slots.

The k0 is a slot interval between a slot for transmitting the DCI and a slot for transmitting a PDSCH scheduled by the DCI. The minimum slot interval is a minimum slot interval between the slot for transmitting the DCI and the slot for transmitting the PDSCH. X and Y are both positive integers greater than 1, and X≥Y.

In an example, the network device configures the multi-slot PDCCH monitoring capability for the user equipment. The multi-slot PDCCH monitoring capability represents that in a monitoring unit which includes X slots, Y consecutive slots for transmitting a PDCCH exist. In this scenario, the user equipment receives the DCI from the network device, the DCI schedules a plurality of PDSCHs, in this scenario, the k0 value indicated by the DCI is less than the minimum slot interval, and the DCI indicates that slots for sending the plurality of PDSCHs are all contained in the Y consecutive slots.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist, and N slots in the Y consecutive slots are configured with search space. The user equipment receives the DCI from the network device, the DCI schedules a plurality of PDSCHs, in this scenario, the k0 value indicated by the DCI is less than the minimum slot interval, and the DCI indicates that the slots for sending the plurality of PDSCHs are all contained in the Y consecutive slots. The minimum slot interval is determined based on a communication protocol and/or is configured through signaling of the network device.

In a multi-slot PDCCH monitoring pattern, a user terminal needs to maintain an awakened state in the above-mentioned Y consecutive slots to ensure the monitoring of the PDCCH. In the above examples, the DCI indicates that the slot for sending the PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

An example of the disclosure provides an information receiving method. The information receiving method is executed by user equipment. The information receiving method may be executed independently or may be executed together in combination with any one of other examples of examples of the disclosure. The information receiving method includes:

receiving, in response to a network device configuring a multi-slot physical downlink control channel (PDCCH) monitoring capability for the user equipment, downlink control information (DCI) from the network device, where, the multi-slot PDCCH monitoring capability represents that in a monitoring unit which includes X slots, Y consecutive slots for transmitting the PDCCH exist, in a scenario where N slots in the Y consecutive slots are configured with search space and the DCI schedules a plurality of PDSCHs, a k0 value indicated by the DCI is less than a minimum slot interval, and the DCI indicates that slots for sending the plurality of PDSCHs are all contained in the N slots.

The k0 is a slot interval between a slot for transmitting the DCI and a slot for transmitting a PDSCH scheduled by the DCI. The minimum slot interval is a minimum slot interval between the slot for transmitting the DCI and the slot for transmitting the PDSCH. X and Y are both positive integers greater than 1, N is a positive integer greater than or equal to 1, X≥Y, and N≤Y.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist, and N slots in the Y consecutive slots are configured with search space. The user equipment receives the DCI from the network device, the DCI schedules a plurality of PDSCHs, in this scenario, the k0 value indicated by the DCI is less than the minimum slot interval, and the DCI indicates that the slots for sending the PDSCHs are all contained in the above N slots.

In a multi-slot PDCCH monitoring pattern, a user terminal needs to maintain an awakened state in the above-mentioned Y consecutive slots to ensure the monitoring of the PDCCH. In the above examples, the DCI indicates that the slot for sending the PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

An example of the disclosure provides an information receiving method. The information receiving method is executed by user equipment. The information receiving method may be executed independently or may be executed together in combination with any one of other examples of examples of the disclosure. The information receiving method includes:

receiving, in response to a network device configuring a multi-slot physical downlink control channel (PDCCH) monitoring capability for the user equipment, downlink control information (DCI) from the network device, where, the multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots.

k0 is a slot interval between a slot for transmitting the DCI and a slot for transmitting a PDSCH scheduled by the DCI. The minimum slot interval is a minimum slot interval between the slot for transmitting the DCI and the slot for transmitting the PDSCH. The minimum slot interval is determined based on a communication protocol and/or is configured through signaling of the network device. X and Y are both positive integers greater than 1, and X≥Y.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist. In this scenario, the user equipment receives the DCI from the network device, the k0 value indicated by the DCI is less than the minimum slot interval, and the DCI indicates that a slot for sending the PDSCH is contained in the Y consecutive slots. The minimum slot interval is determined based on the communication protocol.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist. In this scenario, the user equipment receives the DCI from the network device, the k0 value indicated by the DCI is less than the minimum slot interval, and the DCI indicates that a slot for sending the PDSCH is contained in the Y consecutive slots. The minimum slot interval is configured through the signaling of the network device.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist. In this scenario, the user equipment receives the DCI from the network device, the k0 value indicated by the DCI is less than the minimum slot interval, and the DCI indicates that a slot for sending the PDSCH is contained in the Y consecutive slots. The minimum slot interval is configured based on the communication protocol and through the signaling of the network device.

In a multi-slot PDCCH monitoring pattern, a user terminal needs to maintain an awakened state in the above-mentioned Y consecutive slots to ensure the monitoring of the PDCCH. In the above examples, the DCI indicates that the slot for sending the PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

An example of the disclosure provides an information receiving method. The information receiving method is executed by user equipment. The information receiving method may be executed independently or may be executed together in combination with any one of other examples of examples of the disclosure. FIG. 5 is a flow chart of an information receiving method according to an example. As shown in FIG. 5, the information receiving method includes steps 501 and 502.

Step 501 includes receiving, in response to a network device configuring a multi-slot physical downlink control channel (PDCCH) monitoring capability for the user equipment, downlink control information (DCI) from the network device, where, the multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots.

Step 502 includes receiving the PDSCH based on the DCI.

k0 is a slot interval between a slot for transmitting the DCI and a slot for transmitting a PDSCH scheduled by the DCI. The minimum slot interval is a minimum slot interval between the slot for transmitting the DCI and the slot for transmitting the PDSCH. X and Y are both positive integers greater than 1, and X≥Y.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist. In this scenario, the user equipment receives the DCI from the network device, the k0 value indicated by the DCI is less than the minimum slot interval, and the DCI indicates that a slot for sending the PDSCH is contained in the Y consecutive slots. The user equipment receives the PDSCH based on the slot for sending the PDSCH and indicated by the DCI.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist, and N slots in the Y consecutive slots are configured with search space. In this scenario, the user equipment receives the DCI from the network device, the k0 value indicated by the DCI is less than the minimum slot interval, and the DCI indicates that a slot for sending the PDSCH is contained in the N slots. The user equipment receives the PDSCH based on the slot for sending the PDSCH and indicated by the DCI.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist. In this scenario, the user equipment receives the DCI from the network device, the DCI schedules a plurality of PDSCHs, in this scenario, the k0 value indicated by the DCI is less than the minimum slot interval, and the DCI indicates that slots for sending the plurality of PDSCHs are all contained in the Y consecutive slots. The user equipment receives the plurality of PDSCHs based on the slots for sending the plurality of PDSCHs and indicated by the DCI.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist, and N slots in the Y consecutive slots are configured with search space. In this scenario, the user equipment receives the DCI from the network device, the DCI schedules a plurality of PDSCHs, in this scenario, the k0 value indicated by the DCI is less than the minimum slot interval, and the DCI indicates that slots for sending the plurality of PDSCHs are all contained in the N slots. The user equipment receives the plurality of PDSCHs based on the slots for sending the plurality of PDSCHs and indicated by the DCI.

In a multi-slot PDCCH monitoring pattern, a user terminal needs to maintain an awakened state in the above-mentioned Y consecutive slots to ensure the monitoring of the PDCCH. In the above examples, the DCI indicates that the slot for sending the PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

An example of the disclosure provides an information receiving method. The information receiving method is executed by user equipment. The information receiving method may be executed independently or may be executed together in combination with any one of other examples of examples of the disclosure. The information receiving method includes:

receiving, in response to a network device configuring a multi-slot physical downlink control channel (PDCCH) monitoring capability for the user equipment, downlink control information (DCI) from the network device, where, the multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots.

k0 is a slot interval between a slot for transmitting the DCI and a slot for transmitting a PDSCH scheduled by the DCI. The minimum slot interval is a minimum slot interval between the slot for transmitting the DCI and the slot for transmitting the PDSCH. X and Y are both positive integers greater than 1, and X≥Y.

In an example, the network device configures the multi-slot PDCCH monitoring capability for the user equipment.

The multi-slot PDCCH monitoring capability represents that in a monitoring unit which includes X slots, Y consecutive slots for transmitting the PDCCH exist. The multi-slot PDCCH monitoring capability configured by the network device for the user equipment adopts the fixed-pattern-based multi-slot group mentioned above. In this scenario, the user equipment receives the DCI from the network device, the k0 value indicated by the DCI is less than the minimum slot interval, and the DCI indicates that a slot for sending the PDSCH is contained in the Y consecutive slots.

In an example, the network device configures the multi-slot PDCCH monitoring capability for the user equipment. The multi-slot PDCCH monitoring capability represents that in a monitoring unit which includes X slots, Y consecutive slots for transmitting the PDCCH exist. The multi-slot PDCCH monitoring capability configured by the network device for the user equipment adopts the fixed-pattern-based multi-slot group mentioned above. N slots in the Y consecutive slots are configured with search space. In this scenario, the user equipment receives the DCI from the network device, the k0 value indicated by the DCI is less than the minimum slot interval, and the DCI indicates that a slot for sending the PDSCH is contained in the N slots.

In a multi-slot PDCCH monitoring pattern, a user terminal needs to maintain an awakened state in the above-mentioned Y consecutive slots to ensure the monitoring of the PDCCH. In the above examples, the DCI indicates that the slot for sending the PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

An example of the disclosure provides an information receiving method. The information receiving method is executed by user equipment. The information receiving method may be executed independently or may be executed together in combination with any one of other examples of examples of the disclosure. The information receiving method includes:

- receiving, in response to a network device configuring a multi-slot physical downlink control channel (PDCCH) monitoring capability for the user equipment, downlink control information (DCI) from the network device, where, the multi-slot PDCCH monitoring capability represents that in a monitoring unit which includes X slots and includes M slots, where M>X, Y consecutive slots for transmitting the PDCCH exist, a k0 value indicated by the DCI is less than a minimum slot interval, and the DCI indicates that a slot for sending a physical downlink shared channel (PDSCH) is contained in the Y consecutive slots.

k0 is a slot interval between a slot for transmitting the DCI and a slot for transmitting a PDSCH scheduled by the DCI. The minimum slot interval is a minimum slot interval between the slot for transmitting the DCI and the slot for transmitting the PDSCH. X, Y and M are all positive integers greater than 1, X≥Y, and M>X.

In an example, the network device configures the multi-slot PDCCH monitoring capability for the user equipment. The multi-slot PDCCH monitoring capability represents that in a monitoring unit which includes M slots, Y consecutive slots for transmitting the PDCCH exist. The multi-slot PDCCH monitoring capability configured by the network device for the user equipment adopts the span-pattern-based multi-slot group span mentioned above. In this scenario, the user equipment receives the DCI from the network device, the k0 value indicated by the DCI is less than the minimum slot interval, and the DCI indicates that a slot for sending the PDSCH is contained in the Y consecutive slots.

In an example, the network device configures the multi-slot PDCCH monitoring capability for the user equipment. The multi-slot PDCCH monitoring capability represents that in a monitoring unit which includes M slots, Y consecutive slots for transmitting the PDCCH exist. The multi-slot PDCCH monitoring capability configured by the network device for the user equipment adopts the span-pattern-based multi-slot group span mentioned above. N slots in the Y consecutive slots are configured with search space. In this scenario, the user equipment receives the DCI from the network device, the k0 value indicated by the DCI is less than the minimum slot interval, and the DCI indicates that a slot for sending the PDSCH is contained in the N slots.

In a multi-slot PDCCH monitoring pattern, a user terminal needs to maintain an awakened state in the above-mentioned Y consecutive slots to ensure the monitoring of the PDCCH. In the above examples, the DCI indicates that the slot for sending the PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

An example of the disclosure provides an information transmission apparatus. The information transmission apparatus is applied to a network device. Referring to FIG. 6, the information transmission apparatus includes a processing module 601 and a sending module 602.

The processing module 601 is configured to generate downlink control information (DCI) in response to the network device configuring a multi-slot physical downlink control channel (PDCCH) monitoring capability for user equipment. The multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots.

The sending module 602 is configured to send the DCI to the user equipment.

k0 is a slot interval between a slot for transmitting the DCI and a slot for transmitting a PDSCH scheduled by the DCI. The minimum slot interval is a minimum slot interval between the slot for transmitting the DCI and the slot for transmitting the PDSCH. X and Y are both positive integers greater than 1, and X≥Y.

An example of the disclosure provides an information receiving apparatus. The information receiving apparatus is applied to user equipment. Referring to FIG. 7, the information receiving apparatus includes a receiving module 701.

The receiving module 701 is configured to receive, in response to a network device configuring a multi-slot physical downlink control channel (PDCCH) monitoring capability for the user equipment, downlink control information (DCI) from the network device. The multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots.

k0 is a slot interval between a slot for transmitting the DCI and a slot for transmitting a PDSCH scheduled by the DCI.

The minimum slot interval is a minimum slot interval between the slot for transmitting the DCI and the slot for transmitting the PDSCH. X and Y are both positive integers greater than 1, and X≥Y.

An example of the disclosure provides a network device, including:

one or more processors; and a memory configured to store a processor-executable instruction.

The one or more processors are collectively configured to execute the processor-executable instruction in the memory to implement steps of the above information transmission method.

An example of the disclosure provides a mobile terminal, including:

one or more processors; and a memory configured to store a processor-executable instruction.

The one or more processors are collectively configured to execute the processor-executable instruction in the memory to implement steps of the above information receiving method.

An example of the disclosure provides a non-transitory computer readable storage medium, storing an executable instruction. The executable instruction, when executed by one or more processors, implements steps of the above information transmission method or steps of the above information receiving method.

Figure 8:
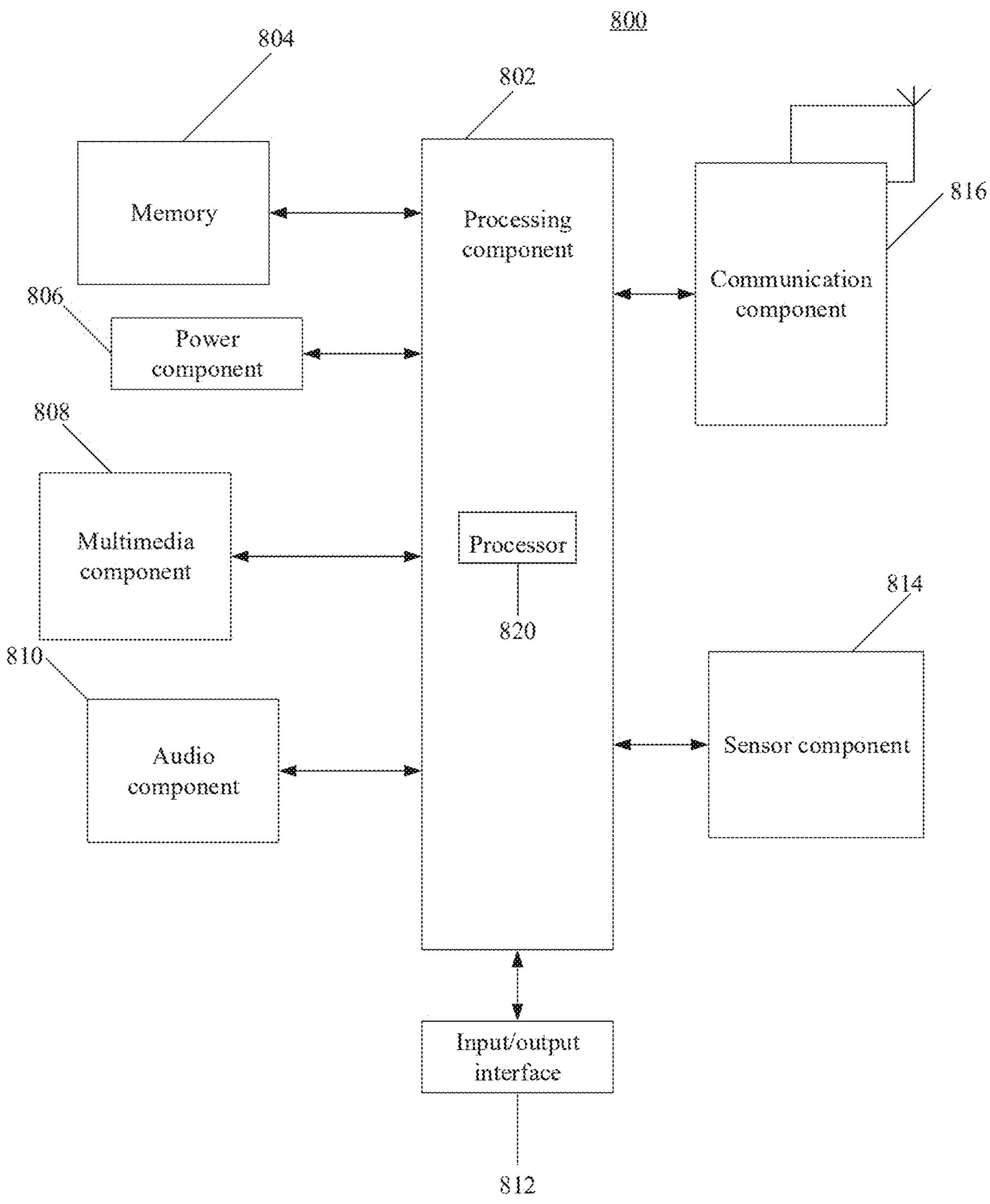
FIG. 8 is a structural diagram of an information receiving apparatus according to an example.

FIG. 8 is a block diagram of an information receiving apparatus 800 according to an example. For example, the information receiving apparatus 800 may be a mobile phone, a computer, a digital broadcasting terminal, a messaging device, a game console, a tablet device, a medical device, a fitness device, a personal digital assistant, etc.

Referring to FIG. 8, the apparatus 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls an overall operation of the apparatus 800, such as operations associated with display, telephone calls, data communication, camera operations, and recording operations. The processing component 802 may include one or more processors 820 to execute instructions to complete all or part of the steps of the above method. In addition, the processing component 802 may include one or more modules to facilitate interaction between the processing component 802 and other components. For example, the processing component 802 may include a multimedia module to facilitate interaction between the multimedia component 808 and the processing component 802.

The memory 804 is configured to store various types of data to support operations at the apparatus 800. Instances of these data include instructions for any application or method operating on the apparatus 800, contact data, phonebook data, messages, pictures, videos, etc. The memory 804 may be implemented by any type of volatile or non volatile storage device or their combination, such as static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disc.

The power component 806 provides power for various components of the apparatus 800. The power component 806 may include a power management system, one or more power sources and other components associated with generating, managing and distributing power for the apparatus 800.

The multimedia component 808 includes a screen providing an output interface between the apparatus 800 and a user. In some examples, the screen may include a liquid crystal display (LCD) and a touch panel (TP). If the screen includes the touch panel, the screen may be implemented as a touch screen to receive an input signal from the user. The touch panel includes one or more touch sensors to sense touch, sliding and gestures on the touch panel. The touch sensor may not only sense the boundary of the touch or sliding action, but also detect the duration and pressure related to the touch or sliding operation. In some examples, the multimedia component 808 includes at least one a front camera or a rear camera. When the apparatus 800 is in an operation mode, such as a shooting mode or a video mode, the front camera and/or the rear camera can receive external multimedia data. Each of the front camera and the rear camera can be a fixed optical lens system or have a focal length and optical zoom capability.

The audio component 810 is configured to output and/or input audio signals. For example, the audio component 810 includes a microphone (MIC) configured to receive an external audio signal when the apparatus 800 is in the operation mode, such as a call mode, a recording mode, and a speech recognition mode. The received audio signal may be further stored in the memory 804 or transmitted via the communication component 816. In some examples, the audio component 810 further includes a speaker for outputting an audio signal.

The I/O interface 812 provides an interface between the processing component 802 and a peripheral interface module. The peripheral interface module may be a keyboard, a click wheel, a button, etc. These buttons may include, but are not limited to: a home button, volume buttons, a start button and a lock button.

The sensor component 814 includes one or more sensors for providing state evaluation of various aspects for the apparatus 800. For example, the sensor component 814 can detect an on/off state of the apparatus 800 and the relative positioning of the components, for example, the component is a display and a keypad of the apparatus 800. The sensor component 814 can also detect the change of the position of the apparatus 800 or one component of the apparatus 800, the presence or absence of user contact with the apparatus 800, the azimuth or acceleration/deceleration of the apparatus 800, and temperature change of the apparatus 800. The sensor component 814 may include a proximity sensor configured to detect the presence of nearby objects without any physical contact. The sensor component 814 may further include an optical sensor, such as a CMOS or CCD image sensor, for use in imaging applications. In some examples, the sensor component 814 may further include an acceleration sensor, a gyroscope sensor, a magnetic sensor, a pressure sensor, or a temperature sensor.

The communication component 816 is configured to facilitate wired or wireless communication between the apparatus 800 and other devices. The apparatus 800 may access a wireless network based on a communication standard, such as Wi-Fi, 2G or 3G, or their combination. In an example, the communication component 816 receives a broadcast signal or broadcast-related information from an external broadcast management system via a broadcast channel. In an example, the communication component 816 further includes a near field communication (NFC) module to facilitate short-range communication. For example, the NFC module may be implemented based on a radio frequency identification (RFID) technology, an infrared data association (IrDA) technology, an ultra wideband (UWB) technology, a Bluetooth (BT) technology and other technologies.

In an example, the apparatus 800 may be implemented by one or more application-specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic elements for executing the above method.

In an example, a non-transitory computer readable storage medium including instructions, such as the memory 804 including instructions, which may be executed by the processor 820 of the apparatus 800 to complete the above method, is also provided. For example, the non-transitory computer readable storage medium may be a ROM, a random access memory (RAM), a CD-ROM, a magnetic tape, a floppy disk, an optical data storage device, etc.

Figure 9:
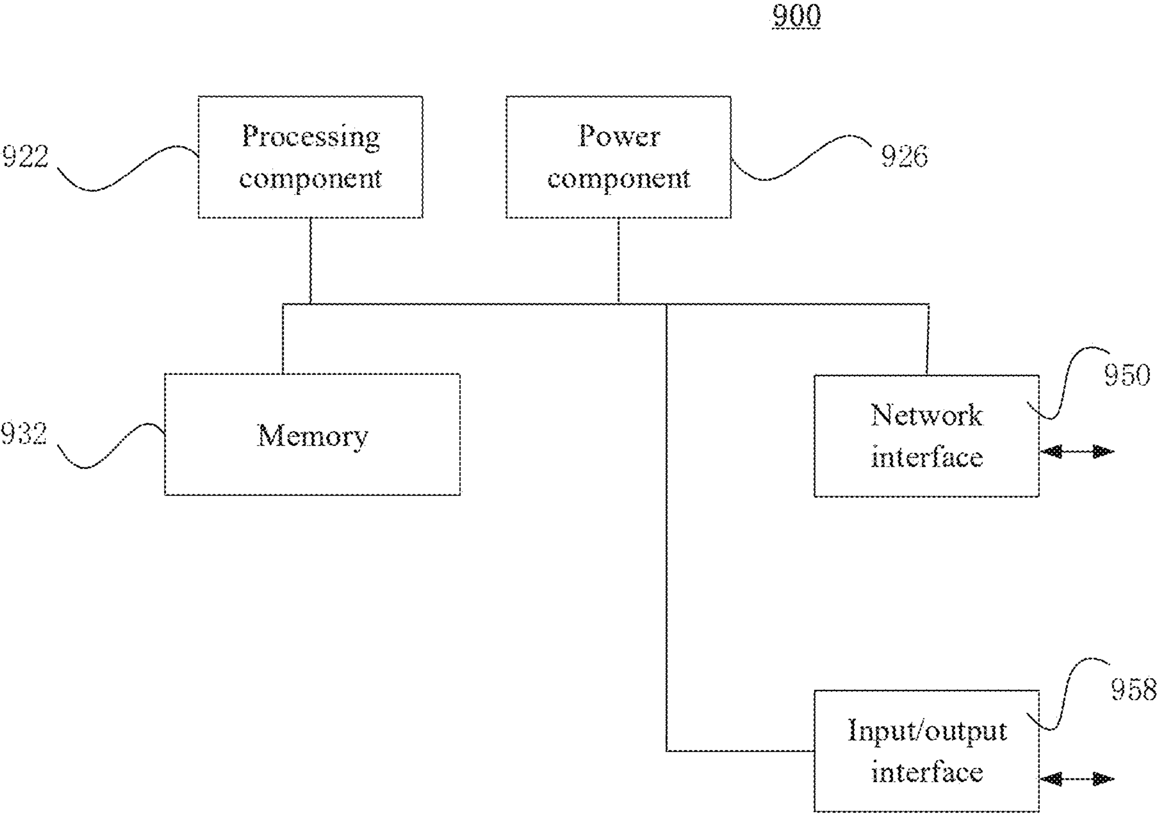
FIG. 9 is a structural diagram of an information transmission apparatus according to an example.

FIG. 9 is a block diagram of an information transmission apparatus 900 according to an example. For example, the apparatus 900 may be provided as a base station. Referring to FIG. 9, the apparatus 900 includes a processing component 922, which further includes one or more processors, and a memory resource represented by a memory 932, which is configured to store instructions, such as applications, executable by the processing component 922. The applications stored in the memory 932 may include one or more modules each corresponding to a set of instructions. In addition, the processing component 922 is configured to execute instructions to execute the above information transmission methods.

The apparatus 900 may further include a power component 926 configured to execute power management of the apparatus 900, a wired or wireless network interface 950 configured to connect the apparatus 900 to the network, and an input/output (I/O) interface 958. The apparatus 900 may operate an operating system stored in the memory 932, such as Windows Server™, Mac OS X™, Unix™, Linux™, FreeBSD™ or the like.

Additional non-limiting embodiments of the disclosure include:

1. An information transmission method, executed by a network device and including:

generating downlink control information (DCI) in response to the network device configuring a multi-slot physical downlink control channel (PDCCH) monitoring capability for user equipment, where, the multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots; and sending the DCI to the user equipment;

where, k0 is a slot interval between a slot for transmitting the DCI and a slot for transmitting the PDSCH scheduled by the DCI, the minimum slot interval is a minimum slot interval between the slot for transmitting the DCI and the slot for transmitting the PDSCH, X and Y are both positive integers greater than 1, and X≥Y.

2. Generating the downlink control information (DCI) in response to the network device configuring the multi-slot PDCCH monitoring capability for the user equipment includes:

generating the DCI in response to the network device configuring the multi-slot PDCCH monitoring capability for the user equipment and in response to N slots in the Y consecutive slots being configured with search space, the DCI indicating that the slot for sending the PDSCH is contained in the N slots;

where, N is a positive integer greater than or equal to 1, and N≤Y.

3. In a scenario where the DCI schedules a plurality of PDSCHs, the DCI indicates that the slots for sending the plurality of PDSCHs are all contained in the Y consecutive slots.

4. In a scenario where the DCI schedules a plurality of PDSCHs, the DCI indicates that the slots for sending the plurality of PDSCHs are all contained in the N slots.

5. The minimum slot interval is determined based on a communication protocol and/or is configured through signaling of the network device.

6. The method further includes:

sending the PDSCH based on the DCI.

7. The multi-slot PDCCH monitoring capability represents that in the monitoring unit which includes X slots, Y consecutive slots for transmitting the PDCCH exist.

8. The multi-slot PDCCH monitoring capability represents that in a monitoring unit which includes M slots, Y consecutive slots for transmitting the PDCCH exist;

where, M is a positive integer greater than 1, and M>X.

9. An information receiving method, executed by user equipment and including:

receiving, in response to a network device configuring a multi-slot physical downlink control channel (PDCCH) monitoring capability for the user equipment, downlink control information (DCI) from the network device, where, the multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots;

where, k0 is a slot interval between a slot for transmitting the DCI and a slot for transmitting a PDSCH scheduled by the DCI, the minimum slot interval is a minimum slot interval between the slot for transmitting the DCI and the slot for transmitting the PDSCH, X and Y are both positive integers greater than 1, and X≥Y.

10. In a scenario where N slots in the Y consecutive slots are configured with search space, the DCI indicates that the slot for sending the PDSCH is contained in the N slots;

where, N is a positive integer greater than or equal to 1, and N≤Y.

11. In a scenario where the DCI schedules a plurality of PDSCHs, the DCI indicates that the slots for sending the plurality of PDSCHs are all contained in the Y consecutive slots.

12. In a scenario where the DCI schedules a plurality of PDSCHs, the DCI indicates that the slots for sending the plurality of PDSCHs are all contained in the N slots.

13. The minimum slot interval is determined based on a communication protocol and/or is configured through signaling of the network device.

14. The method further includes:

receiving the PDSCH based on the DCI.

15. The multi-slot PDCCH monitoring capability represents that in a monitoring unit which includes X slots, Y consecutive slots for transmitting the PDCCH exist.

16. The multi-slot PDCCH monitoring capability represents that in a monitoring unit which includes M slots, Y consecutive slots for transmitting the PDCCH exist;

where, M is a positive integer greater than 1, and M>X.

17. An information transmission apparatus, applied to a network device and including:

a processing module, configured to generate downlink control information (DCI) in response to the network device configuring a multi-slot physical downlink control channel (PDCCH) monitoring capability for user equipment, where, the multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots; and a sending module, configured to send the DCI to the user equipment;

where, k0 is a slot interval between a slot for transmitting the DCI and a slot for transmitting a PDSCH scheduled by the DCI, the minimum slot interval is a minimum slot interval between the slot for transmitting the DCI and the slot for transmitting the PDSCH, X and Y are both positive integers greater than 1, and X≥Y.

18. An information receiving apparatus, applied to user equipment and including:

a receiving module, configured to receive, in response to a network device configuring a multi-slot physical downlink control channel (PDCCH) monitoring capability for the user equipment, downlink control information (DCI) from the network device, where, the multi-slot PDCCH monitoring capability represents that in a monitoring unit which includes X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots;

where, k0 is a slot interval between a slot for transmitting the DCI and a slot for transmitting a PDSCH scheduled by the DCI, the minimum slot interval is a minimum slot interval between the slot for transmitting the DCI and the slot for transmitting the PDSCH, X and Y are both positive integers greater than 1, and X≥Y.

19. A network device, including:

one or more processors; and a memory configured to store a processor-executable instruction;

the one or more processors are collectively configured to execute the executable instruction in the memory to implement steps of the above information transmission method.

20. A mobile terminal, including:

one or more processors; and a memory configured to store a processor-executable instruction;

the one or more processors are collectively configured to execute the executable instruction in the memory to implement steps of the above information receiving method.

21. A non-transitory computer readable storage medium, where the non-transitory computer readable storage medium stores an executable instruction, the executable instruction, when executed by one or more processors, implements steps of the above information transmission method or steps of the above information receiving method.

Other examples of the disclosure will be apparent to those skilled in the art from consideration of the specification and practice of the disclosure. The present disclosure is intended to cover any variations, uses, or adaptations of the examples of the disclosure, and these variations, uses or adaptations follow general principles of the examples of the disclosure and include the common knowledge or customary technical means in the art not disclosed in the disclosure. The specification and examples are considered as instances, and the true scope and spirit of the examples of the disclosure are indicated by the following claims.

It is to be understood that the examples of the disclosure are not limited to the exact structure that has been described above and illustrated in the accompanying drawings, and various modifications and changes may be made without departing from its scope. The scope of the examples of the disclosure is limited by the appended claims.

INDUSTRIAL APPLICABILITY

In the disclosure, the DCI indicates that the slot for sending the PDSCH is contained in the Y consecutive slots. In this way, in a case that the scheduled PDSCH is in the Y consecutive slots, the user equipment can receive the PDSCH while receiving the PDCCH. Thus, the goal of saving power in the multi-slot PDCCH monitoring pattern can be achieved.

The invention claimed is:

1. An information transmission method, executed by a network device, and comprising:

generating downlink control information (DCI) in response to the network device configuring a multi-slot physical downlink control channel (PDCCH) monitoring capability for user equipment, wherein the multi-slot PDCCH monitoring capability represents that in a monitoring unit which comprises X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots; and sending the DCI to the user equipment;

wherein k0 is a slot interval between a slot for transmitting the DCI and a slot for transmitting a PDSCH scheduled by the DCI, the minimum slot interval is a minimum slot interval between the slot for transmitting the DCI and the slot for transmitting the PDSCH, X and Y are both positive integers greater than 1, and X>Y.

2. The information transmission method according to claim 1, wherein generating the downlink control information (DCI) in response to the network device configuring the multi-slot PDCCH monitoring capability for the user equipment comprises:

generating the DCI in response to the network device configuring the multi-slot PDCCH monitoring capability for the user equipment and in response to N slots in the Y consecutive slots being configured with search space, the DCI indicating that the slot for sending the PDSCH is contained in the N slots;

wherein N is a positive integer greater than or equal to 1, and N≤Y.

3. The information transmission method according to claim 2, wherein, in a scenario where the DCI schedules a plurality of PDSCHs, the DCI indicates that slots for sending the plurality of PDSCHs are all contained in the N slots.

4. The information transmission method according to claim 1, wherein, in a scenario where the DCI schedules a plurality of PDSCHs, the DCI indicates that slots for sending the plurality of PDSCHs are all contained in the Y consecutive slots.

5. The information transmission method according to claim 1, wherein the minimum slot interval is determined based on a communication protocol and/or is configured through signaling of the network device.

6. The information transmission method according to claim 1, further comprising:

sending the PDSCH based on the DCI.

7. The information transmission method according to claim 1, wherein the multi-slot PDCCH monitoring capability represents that in a monitoring unit which comprises X slots, Y consecutive slots for transmitting the PDCCH exist.

8. The information transmission method according to claim 1, wherein the multi-slot PDCCH monitoring capability represents that in a monitoring unit which comprises M slots, Y consecutive slots for transmitting the PDCCH exist;

wherein M is a positive integer greater than 1, and M>X.

9. A non-transitory computer readable storage medium, storing an executable instruction, the executable instruction, when executed by one or more processors, implementing steps of the information transmission method according to claim 1.

10. An information receiving method, executed by user equipment, and comprising:

receiving, in response to a network device configuring a multi-slot physical downlink control channel (PDCCH) monitoring capability for the user equipment, downlink control information (DCI) from the network device, wherein the multi-slot PDCCH monitoring capability represents that in a monitoring unit which comprises X slots, Y consecutive slots for transmitting a PDCCH exist, a k0 value indicated by the DCI is less than a minimum slot interval, and the DCI indicates that a slot for sending a physical downlink shared channel (PDSCH) is contained in the Y consecutive slots;

wherein k0 is a slot interval between a slot for transmitting the DCI and a slot for transmitting a PDSCH scheduled by the DCI, the minimum slot interval is a minimum slot interval between the slot for transmitting the DCI and the slot for transmitting the PDSCH, X and Y are both positive integers greater than 1, and X>Y.

11. The information receiving method according to claim 10, wherein, in a scenario where N slots in the Y consecutive slots are configured with search space, the DCI indicates that the slot for sending the PDSCH is contained in the N slots;

wherein N is a positive integer greater than or equal to 1, and N≤Y.

12. The information receiving method according to claim 11, wherein, in a scenario where the DCI schedules a plurality of PDSCHs, the DCI indicates that slots for sending the plurality of PDSCHs are all contained in the N slots.

13. The information receiving method according to claim 10, wherein, in a scenario where the DCI schedules a plurality of PDSCHs, the DCI indicates that slots for sending the plurality of PDSCHs are all contained in the Y consecutive slots.

14. The information receiving method according to claim 10, wherein the minimum slot interval is determined based on a communication protocol and/or is configured through signaling of the network device.

15. The information receiving method according to claim 10, further comprising:

receiving the PDSCH based on the DCI.

16. The information receiving method according to claim 10, wherein the multi-slot PDCCH monitoring capability represents that in a monitoring unit which comprises X slots, Y consecutive slots for transmitting the PDCCH exist.

17. The information receiving method according to claim 10, wherein the multi-slot PDCCH monitoring capability represents that in a monitoring unit which comprises M slots, Y consecutive slots for transmitting the PDCCH exist;

wherein M is a positive integer greater than 1, and M>X.

18. A mobile terminal, comprising:

one or more processors; and a memory configured to store a processor-executable instruction;

wherein the one or more processors are collectively configured to execute the processor-executable instruction in the memory to implement steps of the information receiving method according to claim 10.

19. A non-transitory computer readable storage medium, storing an executable instruction, the executable instruction, when executed by one or more processors, implementing steps of the information receiving method according to claim 10.

20. A network device, comprising:

one or more processors; and a memory configured to store a processor-executable instruction;

wherein the one or more processors are collectively configured to execute the processor-executable instruction in the memory to:

generate downlink control information (DCI) in response to the network device configuring a multi-slot physical downlink control channel (PDCCH) monitoring capability for user equipment, wherein the multi-slot PDCCH monitoring capability represents that in a monitoring unit which comprises X slots, Y consecutive slots for transmitting a PDCCH exist, a k value indicated by the DCI is less than a minimum slot interval, and the DCI indicates that a slot for sending a physical downlink shared channel (PDSCH) is contained in the Y consecutive slots; and send the DCI to the user equipment;

wherein k0 is a slot interval between a slot for transmitting the DCI and a slot for transmitting a PDSCH scheduled by the DCI, the minimum slot interval is a minimum slot interval between the slot for transmitting the DCI and the slot for transmitting the PDSCH, X and Y are both positive integers greater than 1, and X≥Y.

* * * * *